Oct. 6, 1953 J. J. DUGGAN 2,654,119
FISH CUTTING MACHINE
Filed June 5, 1951 4 Sheets-Sheet 2
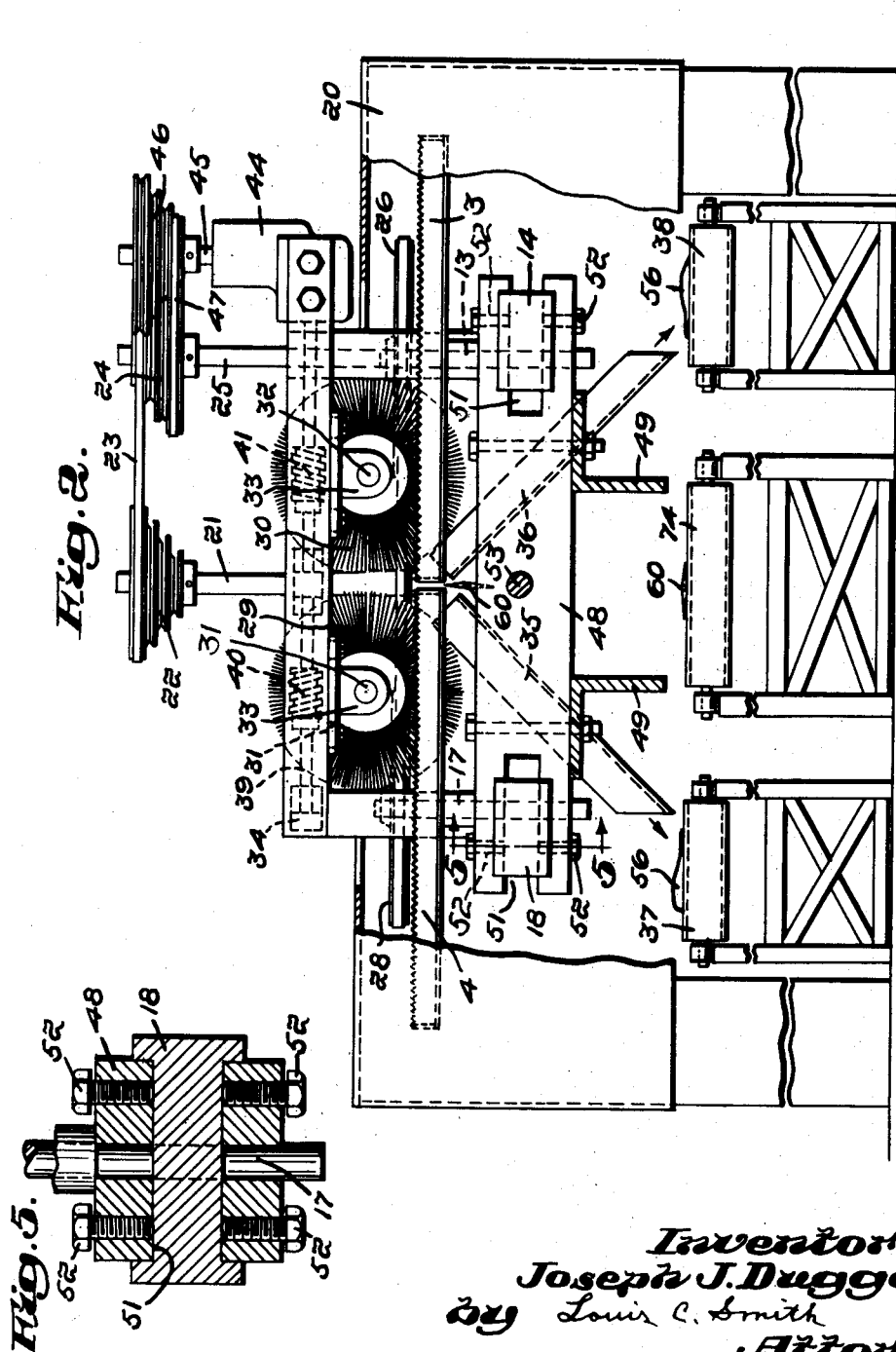
Inventor:
Joseph J. Duggan,
by Louis C. Smith
Attorney

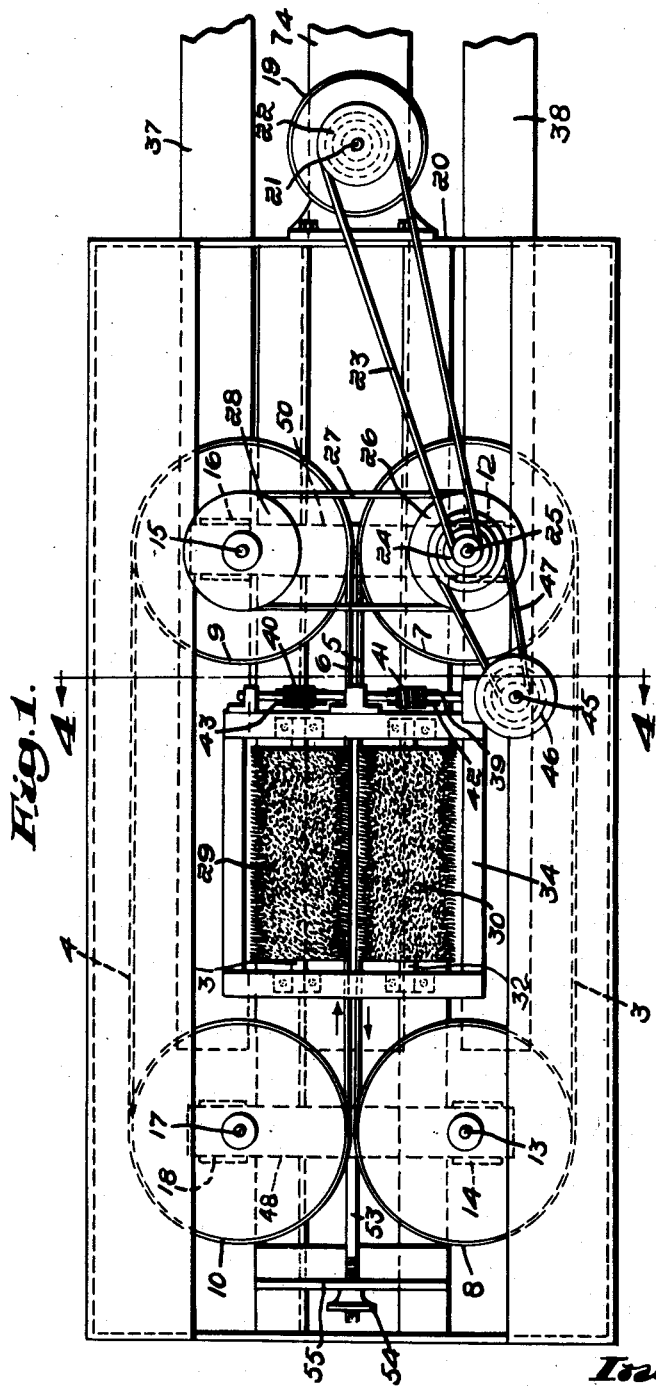

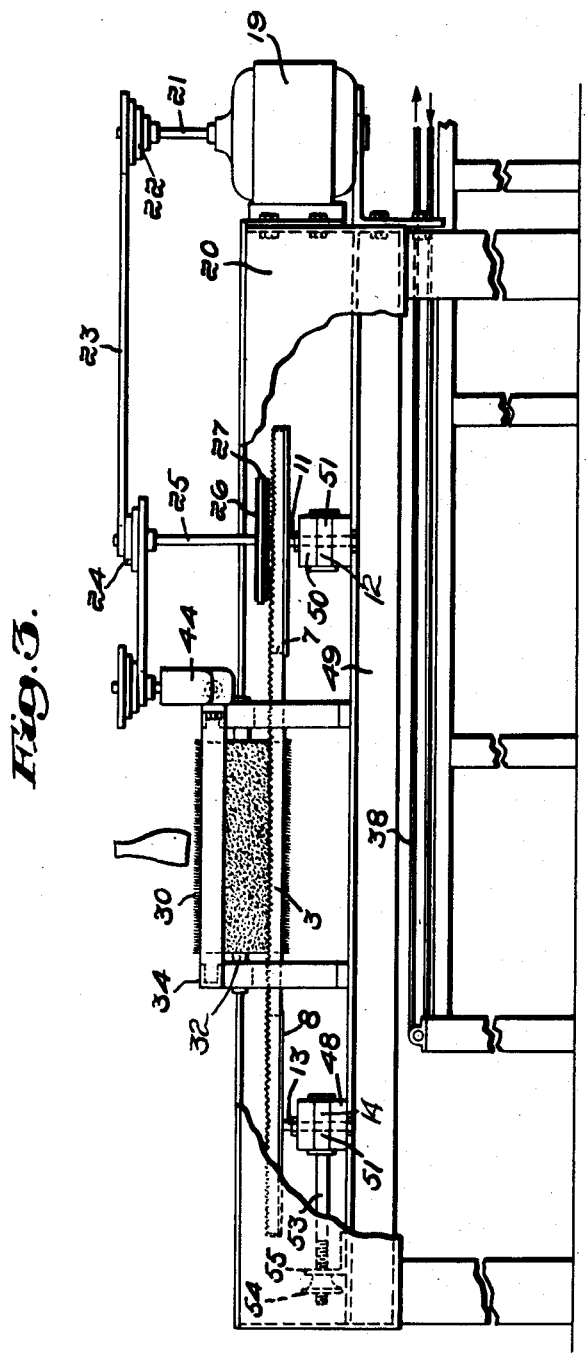

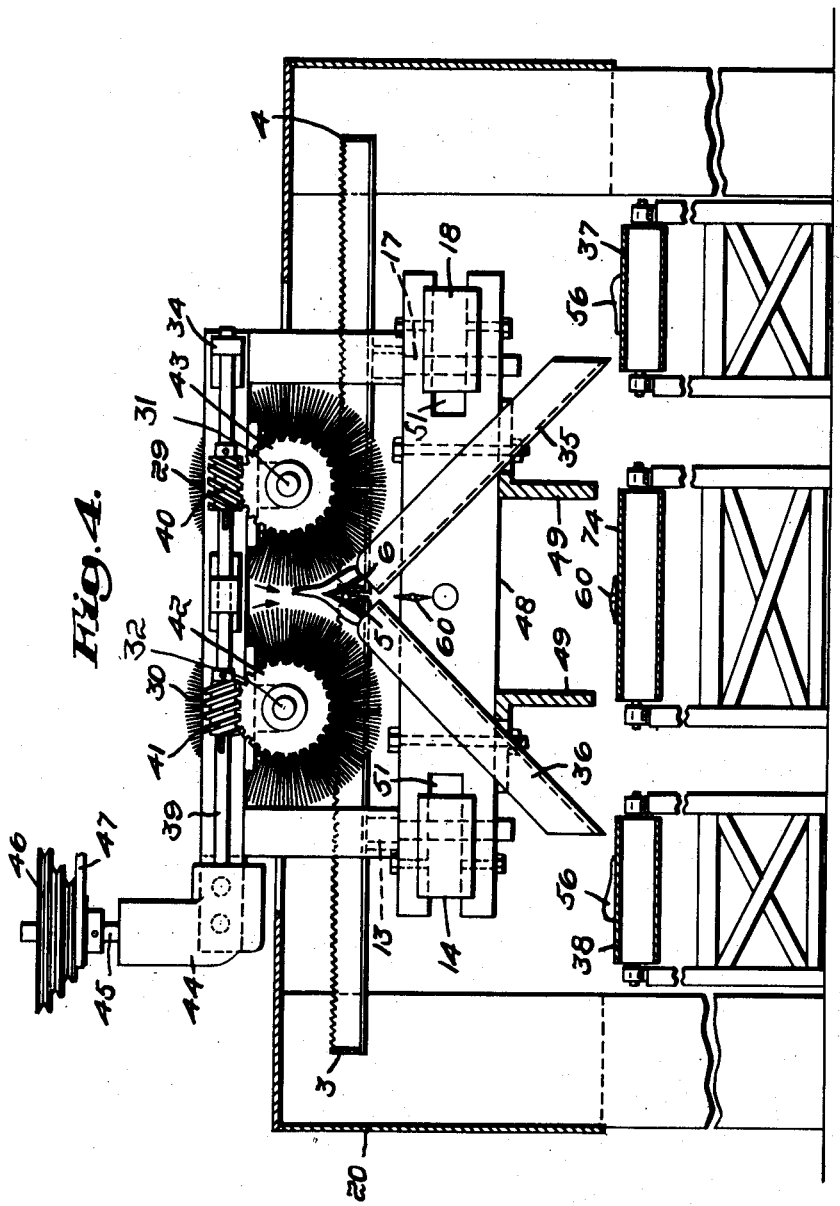

Patented Oct. 6, 1953

2,654,119

UNITED STATES PATENT OFFICE 2,654,119

FISH CUTTING MACHINE

Joseph J. Duggan, Wollaston, Mass.

Application June 5, 1951, Serial No. 229,993

1 Claim. (Cl. 17—4)

This invention relates to a machine for cutting fish and especially for cutting the two fillet-forming sides of a fish from the backbone.

An object of the invention is to provide a machine for this purpose which is simple in construction and inexpensive to manufacture, and which will accurately and rapidly perform its intended function.

In the drawings, wherein I have illustrated a selected embodiment of the invention, Fig. 1 is a top plan view of a fish cutting machine embodying the invention;

Fig. 2 is an nlarged end view of Fig. 1 looking toward the right, with parts broken out;

Fig. 3 is a side view of the machine with part of the frame broken out to better show the construction;

Fig. 4 is an enlarged section on the line 4—4 Fig. 1;

Fig. 5 is an enlarged section on the line 5—5 Fig. 2.

The machine herein shown includes two endless band saw elements 3, 4, which are arranged in parallel relation in the same horizontal plane and with the straight stretch 5 of the band saw 3 parallel to and slightly spaced from the straight stretch 6 of the band saw 4, as best seen in Fig. 1.

The band saw 3 is carried by two pulleys 7 and 8 and the band saw 4 is carried by two pulleys 9 and 10. The pulley 7 is mounted on a vertical shaft 11 which is journaled in a bearing block 12 and the pulley 8 is mounted on a vertical shaft 13 which is journaled in another bearing block 14. The pulley 9 is fast on a vertical shaft 15 journaled in a bearing block 16 and the pulley 10 is fast on another vertical shaft 17 journaled in a bearing block 18.

The saws 3 and 4 are arranged with the saw teeth at the top edge thereof, as indicated in Figs. 2 and 3.

The saws are driven from a motor 19 carried by the frame 20 of the machine and having a vertical shaft 21 provided with a driving pulley 22 which is connected by a belt 23 with a pulley 24 on an extension 25 of the shaft 11, said motor thereby giving positive rotative movement to the shaft 11 and pulley 7.

The band saw 4 is driven from the shaft 11, the latter having thereon a pulley 26 which is connected by a belt 27 with a pulley 28 on the shaft 15.

The means for driving the band saws is such that the two adjacent stretches 5 and 6 of the two band saws move in opposite directions, as shown by the arrows in Fig. 1. The reason for this will be presently described.

The fish to be cut is fed to the band saws from above by gravity, and the feeding movement of each fish as it is being acted on by the saws is controlled by two rotary brushes 29, 30 which are located above the band saws and are mounted on parallel supporting shafts 31, 32 carried by bearings 33 mounted on the part 34 of the frame. The shafts 31, 32 are parallel to the straight stretches 5 and 6.

The rotary brushes 29, 30 have relatively stiff bristles which, however, are sufficiently flexible to permit them to yield to accommodate the shape of the fish as it is passing between the brushes. These rotary brushes 29, 30 constitute the sole means for controlling the movement of each fish while it is being delivered to the saws and while the saws are acting thereon to cut the fillet-forming sides therefrom, it being understood that the two brushes are rotated in opposite directions.

In the use of the device, the operator drops a fish into the space between the two brushes 29 and 30, and as soon as the fish is gripped by the bristles of the brushes, said brushes operate to control further downward movement of the fish. As stated above, during each controlled downward movement the straight stretches 5 and 6 of the saws cut the flesh from the sides of the fish close to the backbone 60, thereby forming the two fillets. The backbone moves downwardly between the two straight stretches 5 and 6 of the saws, and the two fillets pass down on opposite sides of the straight stretches 5 and 6, as shown in Fig. 4.

Situated below the saws are two chutes 35, 36 which have a downwardly divergent relation as best shown in Fig. 4. The upper ends of the chutes 35, 36 are spaced apart a distance corresponding to the space between the straight stretches 5 and 6 of the band saws, and the backbone 60 of the fish which is discharged between said straight stretches 5 and 6 will gravitate through the space between the upper ends of the chutes, as clearly seen in Fig. 4.

The fillet which is cut from the fish by the stretch 5 of the band saw 3 will drop into the upper end of the chute 36, while the fillet which is cut from the other side of the fish by the straight stretch 6 of the band saw 4 will drop into the other chute 35.

Situated beneath the delivery end of the chute 35 is an endless conveyor 37 onto which the fillet 56 is deposited, and also situated beneath the delivery end of the chute 36 is another endless conveyor 38 to receive the fillet 56 which is deposited into said chute.

Situated between the endless conveyors 37 and 38 is a third endless conveyor 14 which is directly underneath the space between the upper ends of the chutes 35, 36, said endless conveyor 34 being thus positioned to receive the backbone 60 as it gravitates through the space between the upper ends of the chutes.

During the fish cutting operation the engagement of the portion 5 of the saw 3 with the fish will tend to move the fish in the direction in which the saw is moving, and the action of the portion 6 of the saw 4 will have a similar effect on the fish. However, since the two sections 5 and 6 of the saws are moving in opposite directions the tendency of each section to move the fish in the direction in which it is moving is counteracted by the same tendency on the part of the other section and hence the fish will move downwardly against the saws and without being displaced laterally by the movement of the saws.

The feeding cylinders 29, 30, may be rotated in any suitable way. As herein shown they are operated by a shaft 39 carried by the portion 34 of the frame and having thereon two spiral or worm gears 40, 41, which mesh with gears 42, 43, fast on the shafts 31, 32. The two worm gears 40, 41, are of opposite pitch and by reason of this the rotation of the shaft 39 will rotate the feeding cylinders 29, 30, in opposite directions.

The shaft 39 is shown as being connected by suitable gearing (not shown) in a gear box 44 to a vertical shaft 45 which has thereon a pulley 46 that is connected by a driving belt 47 to a pulley on the shaft 25.

The bearing blocks 14, 18, are carried by a cross beam 48 mounted on two longitudinally extending angle irons 49 forming part of the supporting frame, and the bearing blocks 12 and 16 are carried by another cross beam 50 also mounted on the angle irons 49. The bearing blocks are preferably adjustably secured to the cross beams so as to provide for adjusting the space between the stretches 5 and 6 of the band saws. For this purpose each bearing block is carried in a slot 51 with which the corresponding cross beam is provided and each block is clamped in position in the slot by means of clamping screws 52.

The cross piece 48 carrying the bearing blocks 18 and 14 is mounted for adjustment longitudinally of the frame for the purpose of maintaining the band saws under proper tension. For this purpose a rod 53 is secured to the cross member 48 and said rod carries at its outer end an adjusting nut 54 which is screw threaded thereto and which bears against a stationary part 55 of the frame so that by turning the nut the cross piece 48 can be moved toward the left, Fig. 1, if necessary for placing the band saws under tension.

The operation of the machine is extremely simple as it merely involves dropping each fish into the space between the brushes 29 and 30. As stated above, when the fish comes into contact with the brushes the further downward feeding movement thereof is controlled by the brushes until the fillets have been cut from the fish and deposited into the chutes 35, 36, and the backbone has been discharged onto the conveyor 14 through the space between the upper end of the chutes.

I claim:

A machine for cutting the two fillet-forming sides of a fish from the backbone portion comprising two cutting elements arranged parallel to each other and spaced apart a sufficient distance to permit the backbone portion of a fish to pass therebetween as said cutting elements cut the two fillet-forming sides from the fish, two oppositely disposed downwardly diverging chutes, means supporting said chutes below the cutting elements with the upper end of one chute directly beneath one cutting element and the upper end of the other chute directly beneath the other cutting element and with the upper ends of the chutes spaced apart a distance approximately corresponding to the distance between the cutting elements, and with the space between the chutes located directly beneath and in line with the space between the cutting elements, whereby the fillet cut from a fish by one cutting element is directed into one chute and the fillet cut from the fish by the other cutting element is directed into the other chute, and the backbone portion of the fish passes through the space between the cutting elements and gravitates through the space between the upper ends of the chutes, means to receive the fillets as they are delivered from the chutes and other means to receive the backbone portions of the fish after they gravitate through the spaces between the upper ends of the chutes.

JOSEPH J. DUGGAN.

References Cited in the file of this patent

UNITED STATES PATENTS

| Number | Name | Date |
|---|---|---|
| 1,728,254 | Rieske | Sept. 17, 1929 |
| 1,759,828 | Barry | May 27, 1930 |
| 1,883,822 | Reid et al. | Oct. 18, 1932 |
| 2,144,302 | Wellbaum | Jan. 17, 1939 |
| 2,316,200 | Vollmer et al. | Apr. 13, 1943 |
| 2,552,985 | Leuschner | May 15, 1951 |